(12) United States Patent
Lu et al.

(10) Patent No.: US 8,739,119 B2
(45) Date of Patent: May 27, 2014

(54) METHOD FOR INSERTING CODE INTO .NET PROGRAMS AND APPARATUS THEREFOR

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 12 days.

(21) Appl. No.: 12/989,681

(22) PCT Filed: Jul. 28, 2010

(86) PCT No.: PCT/CN2010/075516
§ 371 (c)(1),
(2), (4) Date: Jun. 30, 2011

(87) PCT Pub. No.: WO2011/076010
PCT Pub. Date: Jun. 30, 2011

(65) Prior Publication Data
US 2012/0272212 A1    Oct. 25, 2012

(30) Foreign Application Priority Data

Dec. 24, 2009  (CN) .......................... 2009 1 0243880

(51) Int. Cl.
*G06F 9/44* (2006.01)
*G06F 9/445* (2006.01)
(52) U.S. Cl.
CPC .................................. *G06F 9/44521* (2013.01)
USPC ....................................................... 717/110
(58) Field of Classification Search
CPC .................................................. G06F 9/44521
USPC ................................................. 717/110, 121
See application file for complete search history.

(56) References Cited

U.S. PATENT DOCUMENTS

| 6,334,213 | B1* | 12/2001 | Li ................................. 717/170 |
| 8,090,959 | B2* | 1/2012 | Lu et al. ....................... 713/190 |
| 2005/0198507 | A1* | 9/2005 | Brender et al. ............... 713/170 |
| 2008/0288962 | A1* | 11/2008 | Greifeneder et al. ......... 719/317 |
| 2009/0249373 | A1* | 10/2009 | Lu et al. ....................... 719/331 |

OTHER PUBLICATIONS

Ashkbiz Danehkar; "Injective Code inside Import Table"; CodeProject.com website; Mar. 29, 2007.*
Vladimir Sadov; "VB.Net and other things: Loading platform neutral (any cpu) executables on 64bit machine"; Microsoft (tm) VB.net website; Jun. 21, 2005.*

* cited by examiner

*Primary Examiner* — Qing Chen
*Assistant Examiner* — Clint A Thatcher
(74) *Attorney, Agent, or Firm* — Hammer & Associates, P.C.

(57) ABSTRACT

The present invention discloses a method for inserting code into .Net program and an apparatus therefor, relating to the field of information security. The method comprises the steps of: writing information of code to be inserted to import table of a .Net executable file; adding address of the code to be inserted to import address table (IAT) of the .Net executable file to form a new import address table; change offset address of entry point of the .Net executable file to address of the new IAT; and change flag in header of metadata table of the .Net executable file to enable the .Net executable file to meet certification requirements when being executed. The apparatus comprises a writing module, a forming module, and a modification module. The method and apparatus provided by the present invention implement code insertion into .Net executable file without the dependency on assembly and disassembly tools and are easy to use. The problems of low efficiency, poor stability, and poor compatibility in inserting code into .Net executable file can be solved by the present invention.

2 Claims, 3 Drawing Sheets

METHOD FOR INSERTING CODE INTO .NET PROGRAMS AND APPARATUS THEREFOR

FIELD OF THE INVENTION

The present invention relates to information security, and more particularly, to a method for inserting code into .Net programs and apparatus therefor.

BACKGROUND OF THE INVENTION

As a new cross-language software development platform based on the Internet, .Net was introduced by Microsoft in line with the trends of distributed computing, component oriented and enterprise-level applications, as well as software as a service and web-centered demands in the software industry. Actually, it is not a development language. But a number of development languages are supported for the .Net platform, such as C#, C++, Visual Basic, and Java script.

The compilation of a .Net program is divided into two stages. First, the .Net program in an advanced language is converted to code in an intermediate language (IL). Then, the code in the intermediate language is converted to code in a machine language. Compared to the advanced language, the IL is more similar to the machine language. However, the IL provides some abstract concepts (e.g. classes and exceptions). This is why it is called "intermediate language".

In the prior art, an executable file of a .Net program is often decompiled into IL code before inserting other IL code (e.g. an encryption/decryption function) into it. Finally, all of the IL code is compiled into a .Net program. This process needs de-compilation and compilation, which is complex and inconvenient. Thus, the efficiency is very low. In addition, the compatibility cannot be ensured. And there are a lot of limits for modifying the .Net program in this way. For example, it is impossible to insert code into the programs compiled by VC.Net, which are based on both the assembly and IL instructions.

SUMMARY OF THE INVENTION

To overcome the problems of the prior art, the present invention provides a method for inserting code into .Net program and apparatus therefor. The solution is described as follows:

A method for inserting code into .Net program, comprising the steps of:

writing information of code to be inserted to import table of a .Net executable file;

adding address of the code to be inserted to import address table of the .Net executable file to form a new import address table;

changing offset address of entry point of the .Net executable file to address of the new import address table; and modifying flag in header of metadata table of the .Net executable file to enable the .Net executable file to meet certification requirements when being executed.

The step of adding address of the code to be inserted to import address table of the .Net executable file to form a new import address table comprises the following sub-steps of:

enabling a new address and copying the content of the import address table of the .Net executable file to the new address; and adding the address of the code to be inserted after the copied content of the import address table to form a new import address table, the address of the new import address table is the new address.

The step of modifying flag in header of metadata table of the .Net executable file to enable the .Net executable file to meet certification requirements when being executed comprises the following sub-steps of:

changing the flag in the header of the metadata table of the .Net executable file to 0 to enable the .Net executable file to meet certification requirements when being executed.

Before writing the information of the code to be inserted to the import table of the .Net executable file, the method further comprises the following step of:

compiling source code of the .Net program into a .Net executable file.

The information includes the engine dynamic-linking library and the corresponding function of the code to be inserted.

An apparatus for inserting code into .Net program, comprising:

a writing module, adapted to write information of the code to be inserted to the import table of a .Net executable file;

a forming module, adapted to add the address of the code to be inserted to the import address table of the .Net executable file to form a new import address table, and change the offset address of the entry point of the .Net executable file to the address of the new import address table; and a modification module, adapted to modify the flags of the header of the metadata table of the .Net executable file to enable the .Net executable file to meet certification requirements when being executed.

The forming module particularly comprises:

a forming unit, adapted to enable a new address, copy the content of the import address table of the .Net executable file to the new address, and add the address of the code to be inserted after the content that has been copied to the new address to form a new import address table, wherein the address of the new import address table is the new address.

The modification module particularly comprises:

a modification unit, adapted to change the flags of the header of the metadata table of the .Net executable file to 0 to enable the .Net executable file to meet certification requirements when being executed.

The apparatus further comprises:

a compilation unit, adapted to compile the source code of the .Net program into a .Net executable file before the writing module writes the information of the code to be inserted to the import table of the .Net executable file.

The information includes the engine dynamic-linking library and the corresponding function of the code to be inserted.

The above solution discards the dependency on the assembly and disassembly tools and easily implements the insertion of code into .Net executable file, solving the problems of low efficiency and poor stability and compatibility in inserting code into .Net executable file.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

To provide more clarity of the object, technical solutions, and merits of the present invention, the embodiments of the present invention are described in combination with the drawings below in details.

Embodiment 1

Figure 1:
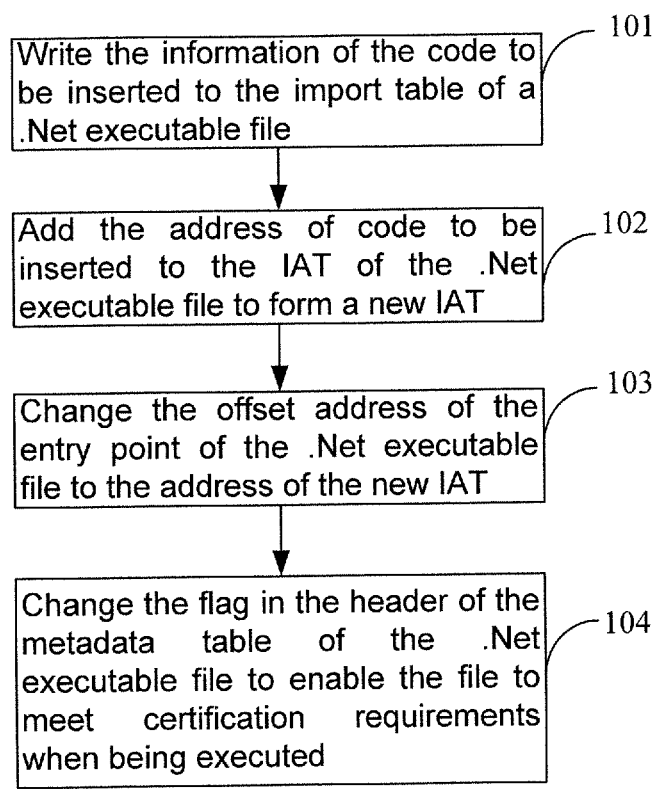
FIG. 1 is a flow diagram of a first method for inserting code into .Net program in accordance with the first embodiment of the present invention.

Referring to FIG. 1, this embodiment provides a method for inserting code into .Net program. The method includes the following steps:

Step 101: Write the information of the code to be inserted to the import table of a .Net executable file;

Step 102: Add the address of the information of the code to be inserted to the import address table (IAT) of the .Net executable file to form a new IAT;

Step 103: Change the offset address of the entry point of the .Net executable file to the address of the new IAT; and Step 104: Change the flags in the header of the metadata table of the .Net executable file to enable the .Net executable file to meet certification requirements when being executed.

Figure 2:
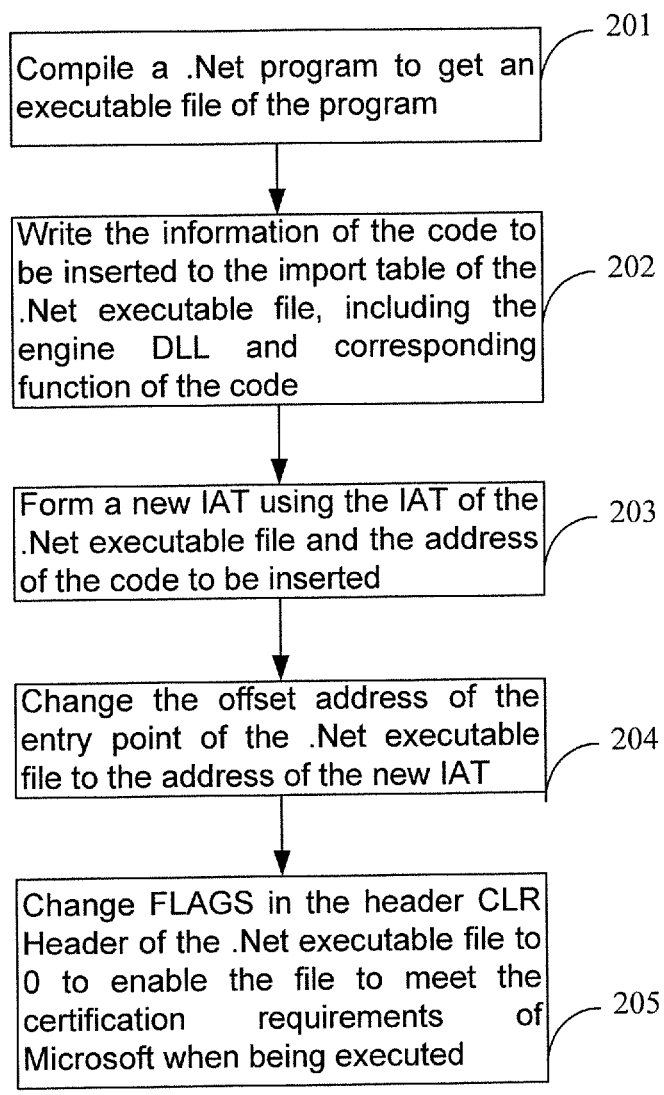
FIG. 2 is a flow diagram of a second method for inserting code into .Net program in accordance with the first embodiment of the present invention.

In this embodiment of the present invention, the code to be inserted is determined in advance by the user according to his/her requirements. The content of the code is not limited herein. Typically, the code includes one or more functions. The above method is further set forth below using an encryption/decryption function as an example of the code. Referring to FIG. 2, the above method of the present invention can include the following detailed steps:

Step 201: Compile the source code of a .Net program to generate an executable file based on the source code.

The compilation of the source code of the .Net program can be divided into two stages: compile the source code of the .Net program in an advanced programming language into a kind of code in an intermediate language (IL), and then compile the code in the intermediate language (IL) into an executable file.

Normally, the .Net executable file generated from the compilation contains the standard executable file information, the block table, and the metadata table. The standard executable file information is the standard PE (Portable Executable) file header and block table in the executable file. The PE file header can be used to recognize if the current file is an executable file. The block table is used to store code, resources, and data. The metadata table can be located in the block table, and used for storing various .Net data, such as classes, parameters, and functions.

For example, the following is the source code of a .Net program:

```
namespace ConsoleApp
{
    class Program
    {
        static void Main(string[ ] args)
        {
            String str = "This is a test!";
            Console.WriteLine(str);
        }
    }
}
```

The source code of the .Net program is compiled into an executable file ConsoleApp.exe. The following is a list of the components of the executable file:

TABLE 1

Dos Header
NT Header
Section Headers
Import Pages
Import Information
Export Pages
Export Information
Resource Pages
Resource Information
...
CLR Header
Meta Tables
...

As shown above, Dos Header and NT Header are the PE file header; Sections Headers are the header of the block table; the contents under the header of the block table are the block table, where the import table, the export table, the resource table, and the code are stored; CLR Header is the header of the metadata table; and Meta Tables are the metadata table. The import table includes Import Pages and Import Information. The export table includes Export Pages and Export Information. The resource table includes Resource Pages and Resource Information. Unrelated block tables are not listed.

The import table of the executable file based on the source code of the .Net program is a concept relating to the PE file format. It describes the dynamic-linking libraries (DLL) and their functions imported in the DLL.

The dynamic-linking library (DLL) is an executable file used as a collection of some shared functions and provided for dynamic linking, thus allowing the process to call the functions other than its executable code. The executable code of the functions is located in a DLL. The DLL contains one or more functions that have been compiled and linked to and are stored at a location separate from the process using them. The DLL is helpful for sharing data and resources. The content of a copy of a DLL can be accessed from the memory by more than one program at one time. That is, the DLL is a collection of code and data that can be used by multiple programs at the same time. Modular program can be designed by using DLLs. The modular program contains a set of components that are relatively independent of each other. For example, an accounting program can be sold module by module. The modules can be loaded into the main program at runtime. Since the modules are independent of each other, the program can be loaded quickly. In addition, a module is loaded only if it is needed.

Step 202: Write the information of the code to be inserted to the import table of the .Net executable file. The information includes the engine dynamic-linking library and corresponding function of the code to be inserted.

Taking the executable file ConsoleApp.exe as an example, an external DLL "mscoree.dll" is imported into the file and an export function _CorExeMain of the DLL is also imported into the file. The import table of the executable file is as follows:

| [Import Tables] | | | | |
|---|---|---|---|---|
| DllName | OriginaFirstThunk | TimeDateStamp | ForwarderChain | Name |
| mscoree.dll | 0000A230 | 00000000 | 00000000 | 0000A24C |
| FirstThunk | ThunkRVA | ThunkOffset | ThunkValue | Hint | ApiName |
| 0000A228 | 0000A230 | 00006830 | 0000A23E | 0000 | _CorExeMain |

All of the above information is about the DLL mscoree.dll. The information includes the name of the external DLL that is imported (mscoree.dll) and the name of the function that is imported (_CorExeMain).

The mscoree.dll is a .Net Framework related component. The file is a Browser Helper Object (BHO). Each time a user opens an Internet browser, it is opened and started automatically. Because the BHO is recognized as the browser itself, it is not blocked by personal firewalls. The function _CorExeMain is used to indicate the Windows loader to find the entry point from the executable image.

In this embodiment, the function Startup is the code to be inserted. The engine dynamic-linking library of the function is Engine.dll. The following import table is generated after adding the related information of the code to be inserted to the above import table:

| [Import Tables] | | | | |
|---|---|---|---|---|
| DllName | OriginaFirstThunk | TimeDateStamp | ForwarderChain | Name |
| mscoree.dll | 0000A230 | 00000000 | 00000000 | 0000A24C |
| Engine.dll | 0000B5C0 | 00000000 | 00000000 | 0000B602 |
| FirstThunk | ThunkRVA | ThunkOffset | ThunkValue | Hint | ApiName |
| 0000A228 | 0000A230 | 00006830 | 0000A23E | 0000 | _CorExeMain |
| 0000B612 | 0000B5C0 | 00009830 | 0000B5CE | 0000 | Startup |

The function Startup can be in the following format:

```
BOOL __declspec(dllexport) Startup ( )
{
    // Implement the feature of this function here (e.g. encryption and
    decryption)
    ......
    return TRUE;
}
The DLL of the function Startup is as follows:
BOOL APIENTRY DllMain( HMODULE hModule,
            DWORD ul_reason_for_call,
            LPVOID lpReserved
            )
{
    switch (ul_reason_for_call)
    {
    case DLL_PROCESS_ATTACH:{
        break;
            }
    case DLL_THREAD_ATTACH:
    case DLL_THREAD_DETACH:
    case DLL_PROCESS_DETACH:
        break;
    }
    return TRUE;
}
```

Step 203: Form a new IAT using the IAT (Import Address Table) of the .Net executable file and the address of the code to be inserted.

All real addresses of the import functions referenced by the .Net executable file are described in the IAT. The import functions are a set of functions called by the .Net program. But the code of the import functions is not a part of the .Net program. The code of these functions is located in one or more DLLs. When the .Net executable file is loaded into the memory, the Windows loader loads the DLL(s) and links the commands calling the import functions to the actual addresses of the functions, thus achieving dynamic linking. The commands calling the import functions are linked to the actual addresses of the functions using the IAT.

In this embodiment, it is required to add the address of the code to be inserted to the IAT to insert the code into the .Net executable file. For the example as described above, the address of the function Startup should be added to the IAT to call the function later. The original IAT contains only the address of the export function _CorExeMain imported by the .Net executable file, as shown below:

Address
3E A2 00 00 00 00 00 00

A new IAT is generated after adding the address of the function Startup to the IAT, as shown below:

Address
3E A2 00 00 CE B5 00 00 00 00 00 00

Typically, the space of the memory used by the original IAT is fixed in size. It is impossible to add the address of the function Startup to the IAT directly. But this can be achieved as follows:

Enable a new address. That is, allocate a piece of memory space. Copy the content of the original IAT of the .Net executable file to the new address. Add the address of the code to be inserted after the content that has been copied to the new address. Thus, a new IAT is generated. The address of the new IAT is the new address that has been enabled. For example, the original IAT is stored at the address 0X2000. Its length is 4 bytes. Enable a new address 0X5000, the length of which is 8 bytes. First, copy the content of the original TAT (4 bytes in total) to the address 0X5000. Add the address of the function Startup afterwards (4 bytes). A 8-byte new IAT is then generated. The address of the new IAT is 0X5000. The original TAT is discarded.

Step 204: Change the offset address of the entry point of the .Net executable file to the address of the new IAT.

The offset address of the entry point of the .Net executable file points to the address of the IAT. Since a new IAT is formed and the original is discarded and the address of the new IAT is not the address of the original, the offset address of the entry point of the .Net executable file must be changed to the address of the new IAT. Therefore, the .Net executable file can run normally.

In this embodiment, the offset address of the entry point of the .Net executable file is changed to the address of the new IAT. The code implementation of this operation is as follows:

```
/*EntryPoint*/
IMAGE_NT_HEADERS * pNtHeader =NULL;
pNtHeader = RtlImageNtHeader(pvBase,dwSize);
PBYTE pEntryPoint = NULL;
pEntryPoint =RtlImageRvaToVa(pNtHeader,
pvBase,
pNtHeader->OptionalHeader.AddressOfEntryPomt,
0);
pEntryPoint +=2; /*FF 25*/
DWORD dwEEIAT = 0x400000 + RtlGetIatRva( );
memcpy(pEntryPoint,(PBYTE)&dwEEIAT,4);
```

Step 205: Set the value of the FLAGS in the metadata table header CLR Header of the .Net executable file to 0 to enable the .Net executable file to meet the certification requirements of Microsoft when being executed.

CLR Header is the header of the metadata table of the .Net executable file and is a data structure used for depicting metadata information. When the value of the FLAGS is 1, it means "IL ONLY" (i.e. only IL code exists). When the value of the FLAGS is 0, it means a mixed code set. This ensures that the .Net executable file meets the certification requirements of Microsoft when being executed.

The code used for changing the value of FLAGS is as follows:

a forming module 302, adapted to add the address of the code to be inserted to the import address table (IAT) of the .Net executable file to form a new IAT, and change the offset address of the entry point of the .Net executable file to the address of the new IAT; and a modification module 303, adapted to change the flags in the header of the metadata table of the .Net executable file to enable the .Net executable file to meet certification requirements when being executed.

In this embodiment, the information includes the engine dynamic-linking library and corresponding function of the code to be inserted.

The forming module 302 particularly includes:

a forming unit, adapted to enable a new address, copy the content of the IAT of the .Net executable file to the new address, and add the address of the code to be inserted after the content that has been copied to the new address to form a new IAT. The address of the new IAT is the new address thus.

The modification module 303 particularly includes a modification unit, adapted to change the flag in the header of the metadata table of the .Net executable file to 0 to enable the .Net executable file to meet certification requirements when being executed.

In addition, the above apparatus can include a compilation module 304, adapted to compile the source code of the .Net program into a .Net executable file before the writing module 301 writes the information of the code to be inserted to the import table of the .Net executable file.

The method and apparatus provided by the present invention implement code insertion into .Net executable file without the dependency on assembly and disassembly tools and are easy to use. The problems of low efficiency, poor stability, and poor compatibility in inserting code into .Net executable file are solved by the present invention.

All or part of the above solutions can be implemented by programming and/or hardware devices. The program can be stored in storage media that are accessible. The storage media include ROM, RAM, disk, and. CD-ROM.

The provided embodiments above are preferred embodiments of the present invention, and should not be considered as limitation of the present invention. Any modifications,

```
/*Cor Flags*/
IMAGE_COR20_HEADER * pCor = NULL;
pCor = RtlImageCorHeaderForPE(pvBase,dwSize);
if(!pCor){
    _LastError = RESULT_META_DECODER_FAILD;
    return FALSE;
}
if((pCor->Flags& COMIMAGE_FLAGS_ILONLY) ==
COMIMAGE_FLAGS_ILONLY)
        pCor->Flags ^= COMIMAGE_FLAGS_ILONLY;
    if((pCor->Flags&COMIMAGE_FLAGS_IL_LIBRARY)==COMIMAGE_FLAGS_IL_
LIBRARY)
        pCor->Flags ^= COMIMAGE_FLAGS_IL_LIBRARY;
```

After the steps above, the insertion of the code into the .Net program is complete. The new .Net executable file can be executed normally after the insertion.

Embodiment 2

Figure 3:
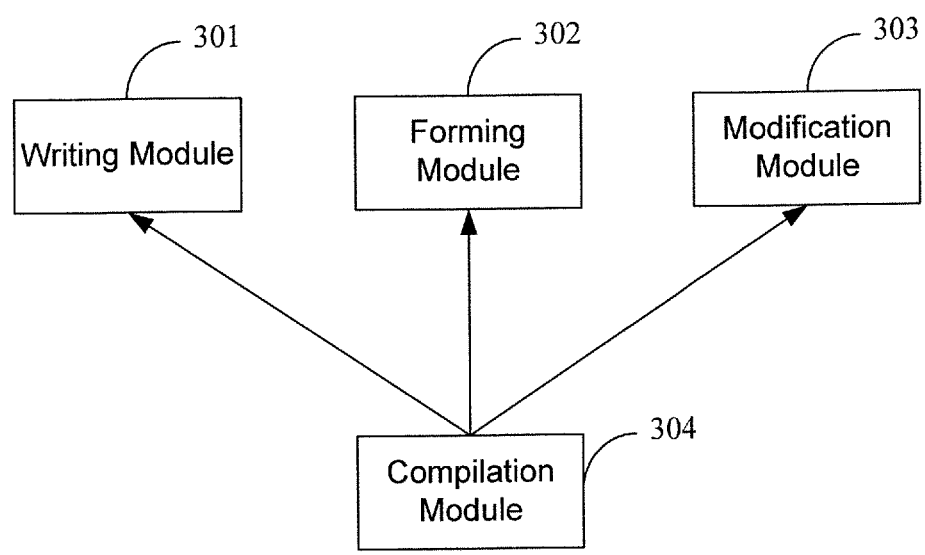
FIG. 3 is a block diagram of the apparatus for inserting code into .Net program in accordance with the second embodiment of the present invention.

Referring to FIG. 3, an apparatus for inserting code into .Net program is provided in the second embodiment of the present invention. The apparatus includes:

a writing module 301, adapted to write the information of the code to be inserted to the import table of the .Net executable file;

equivalent replacements, and improvements according to the principle or derived from the spirit of the present invention should fall into the scope of the present invention.

The invention claimed is:

1. A method for inserting code into .Net program, comprising the steps of:
compiling source code of a .NET program to generate a .NET executable file based on the source code;
writing information of an external DLL and encryption and decryption functions of the DLL to import table of a the .Net executable file;

enabling a new address and copying the content of the import address table of the .Net executable file to the new address;

adding the address of the functions to be inserted after the copied content of the import address table to form a new import address table, in which the address of the new import address table is the new address;

changing offset address of entry point of the .Net executable file to address of the new import address table; and modifying flag in header of metadata table of the Net executable file to enable the .Net executable file to meet certification requirements when being executed, wherein the modified flag indicates a mixed code set of assembly and IL instructions.

2. The method of claim 1, wherein the step of modifying flag in header of metadata table of the .Net executable file to enable the .Net executable file to meet certification requirements when being executed comprises the following sub-step of:

changing the flag in the header of the metadata table of the .Net executable file to 0 to enable the .Net executable file to meet certification requirements when being executed.

\* \* \* \* \*